United States Patent [19]
Shimokawa

[11] Patent Number: 4,847,181
[45] Date of Patent: Jul. 11, 1989

[54] LASER MARKING METHOD

[75] Inventor: Kiyofumi Shimokawa, Hiroshima, Japan

[73] Assignee: Mazda Motor Corporation, Hiroshima, Japan

[21] Appl. No.: 82,481

[22] Filed: Aug. 7, 1987

[30] Foreign Application Priority Data

Aug. 8, 1986 [JP] Japan .............................. 61-186249

[51] Int. Cl.[4] .......................... B23K 26/18; G03C 1/78

[52] U.S. Cl. .................................... 430/297; 430/273; 430/945; 430/964; 428/344; 428/345; 427/53.1; 219/121.65; 219/121.66; 219/121.68; 219/121.69; 219/121.85; 346/76 L; 156/631; 156/643; 156/272.8; 156/247

[58] Field of Search ................ 428/344, 345; 430/277, 430/964, 945, 495, 273, 278; 156/233, 230, 234, 240, 631, 643, 272.8, 247; 219/121 LE, 121 LF, 121 LH, 121 LJ, 121 LM, 121.65, 121.66, 121.68, 121.69, 121.85; 346/76 C; 148/903, DIG. 51, DIG. 90; 427/53.1

[56] References Cited

U.S. PATENT DOCUMENTS 4,275,106 6/1981 Watanabe ........................... 428/344
4,504,571 3/1985 Yamamura et al. ............... 156/234
4,511,641 4/1985 Busman et al. ..................... 430/273
4,640,727 2/1987 Janssen .............................. 156/240
4,743,463 5/1988 Ronn et al. ........................ 427/53.1

FOREIGN PATENT DOCUMENTS 58-67575 4/1983 Japan .
59-45091 3/1984 Japan .

OTHER PUBLICATIONS

English Abstract for Japanese Patent Public Disclosure No. 59-45091, Yumada, 3/13/84.
English Abstract for Japanese Patent Public Disclosure No. 58-67575, Ogino, 4/22/83.

*Primary Examiner*—Paul R. Michl
*Assistant Examiner*—Lee C. Wright
*Attorney, Agent, or Firm*—Fleit, Jacobson, Cohn, Price, Holman & Stern

[57] ABSTRACT

A laser marking method comprising steps of preparing a label material consisting of a colour layer and a transparant layer, applying the label material on a marking surface of a work, illuminating the marking surface through the label material with a laser beam of a wave length transilluminating the transparent layer so as to form a mark of a certain information on the marking surface of the work and in the coloured layer of the label material, and removing the label material from the marking surface of the work to produce a recorded label. The label can be produced simultaniously with the mark on the work wherein the information shown on the label is sophisticatedly identical with the information of the mark on the work surface.

7 Claims, 2 Drawing Sheets

LASER MARKING METHOD

BACKGROUND OF THE INVENTION

1. Field of the Invention

The present invention pertains to a laser marking method, specifically to a method for marking a product and simultaneously making a record label of the product by employing a laser beam.

2. Description of the Prior Art

Conventionally, it has been known that a product is marked or stamped in order to identify the product. For instance, in the automobile industry, it is known that specific information, such as product number, vehicle type, or the like can be provided on a component to be incorporated into a work or vehicle body in order to distinguish the component from others to thereby facilitate on assembly process. Japanese Patent Public Disclosure No. 58-67575, laid open to the public on Apr. 22, 1983, discloses a method for providing such information on a component by utilizing a paint containing a ferromagnetic material wherein the ferromagnetic material in the paint is magnetized to be provided with specific vehicle information after coating the paint on the component. Therefore the information can be read after coating. Japanese Patent Public Disclosure No. 59-45091 laid open to the public on Mar. 13. 1984, discloses a device for marking a product or work with a laser beam. Further, it has been known to form a label having information identical with a mark formed on a work after an assembling process. In the case where it is necessary to form both such mark on the work and label, it is desirable to form them simultaneously so as to simplify the marking process and improve the reliability in the identification of the information between the label and the mark. In preparing such a label, there has been known to use a method for producing one or more labels identical with a mark at the saem time when the mark is mechanically formed on a work or vehicle component by employing a marking press. In this method, the labels are disposed on the surface of the work, pressed by the marking press so as to form a mark showing a certain vehicle information and peeled off from the work. However, a problem occurs in the method in that certain portions, such as central portions of the character "0" and "8" surrounded by the marked portion may be dropped out from the label element when the label is peeled off from the work because of no connection of the peripheral portion of the label. As a result, it may be difficult to properly read the information shown on the label. Further, where a plurality of duplicated labels are needed, such label materials are disposed on the surface of the work in an overlapped relationship with each other and the marking press is applied over the label materials so that the pressed mark formed on the work becomes unclear as the overlapped or laminated label materials are increased.

SUMMARY OF THE INVENTION

It is therefore an object of the present invention to provide a simplified method for marking a product or work and simultaneously forming one or more labels showing information identical with the mark on the work.

Another object of the present invention is to provide a marking method for preparing a reliable label highly identical with a mark formed on the product so that the information shown on the label can be readily and correctly read.

According to the present invention, the above and other objects can be accomplished by a laser marking method comprising steps of preparing at least one label material consisting of a first layer absorbing a visible ray and a second layer transilluminating the visible ray, applying the label material on a marking surface of a work, illuminating the marking surface through the label material with a laser beam of a wave length transilluminating said second layer so as to form a mark of a certain information on the marking surface of the work and in said first layer of the label material, and removing the label material from the marking surface of the work to produce a recorded label.

According to the present invention, preferably the first and second layers are formed by separate films and the separate films are joined with each other to form the label material. The first layer or coloured layer may be preferably formed by an aluminum film of approximately 5 through 10 micrometers in thickness. The second layer which is transparent or translucent may be preferably constituted by a plastic film of a resin, such as polyester resin, vinyl chloride base resin and the like because of high transmission of the laser beam. The first layer has a thickness of approximately 50 micrometers. The first layer is deposited on the second layer under vacuum condition to form the label material. Preferably, an adhesive of an acrylic base resin is applied on the label material so as to form a layer of approximately 30 micrometers in thickness for joining the label material and the work therewith.

The laser beam may be preferably produced by employing Nd:YAG( neodymium yttrium aluminum garnet) laser device. Any laser device with a 50 watt rating output can be employed to be driven with approximately 17 A to produce a beam of giant pulse. The laser beam has 1060 nm in wave length with 3 through 6 KHz in frequency.

According to the present invention, the laser beam transilluminates the second layer disposed on the surface of the label material so that there is no change in character of the second layer. On the other hand, the first layer of the label material and the work absorbs the laser beam resulting in change in character or in colour, melting or the like to form a mark denoting a certain information thereon. Thereafter, the label material is peeled off from the marking surface of the work as a label for recording the information concerning the work. By applying the laser beam, preferably, there may be formed recesses of 0.3 through 0.5 mm in top width, 0.1 through 0.15 mm in bottom width and 0.1 through 0.15 mm in depth on the surface of the work.

DESCRIPTION OF THE PREFERRED EMBODIMENTS

The illustrated embodiment will be described in connection with an automobile production process.

Figure 1:
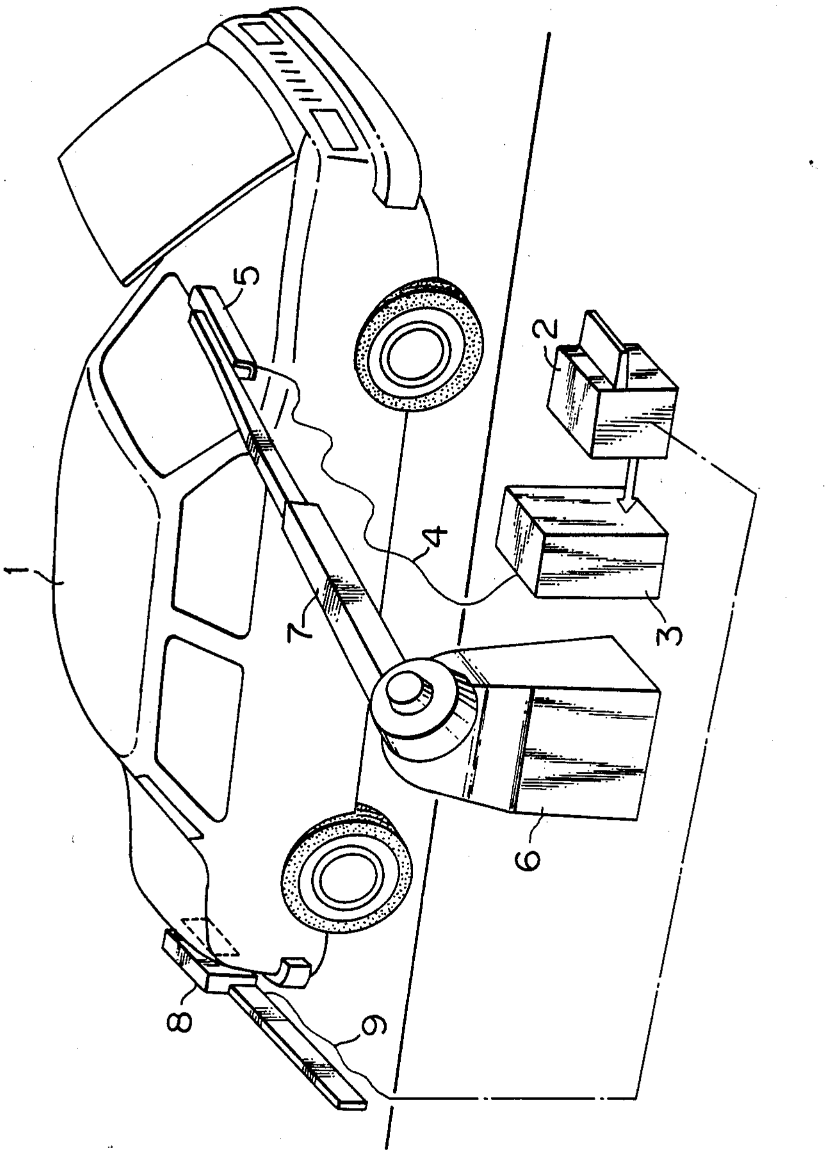
FIG. 1 is a schematic perspective view of a laser marking device for marking a work with a laser beam.

Referring to FIG. 1, vehicle body or work 1 is transferred into a marking station.

In the marking station, there are provided a computer 2 for production management and an oscillator 3 for producing a laser beam of a predetermined wave length by which the marking treatment is carried out. The oscillator 3 is connected with a laser head 5 by means of a cable 4. The laser head 5 is connected with the tip end of an operating device 6 by which the laser head 5 is moved to a predetermined position for marking in accordance with the information or specification of the vehicle such as vehicle type, shape of the work, and the like.

Further there is provided a sensor 8 for reading the vehicle information entered in a predetermined position of the work 1. The information read out by the sensor 8 is sent to the computer 2 through a cable 9. The computer 2 provides the oscillator 3 with a given marking signal based on the information from the sensor 8. The oscillator 3 generates a laser beam of a predetermined wave length to provide a mark on the marking surface of the work 1.

Figure 2:
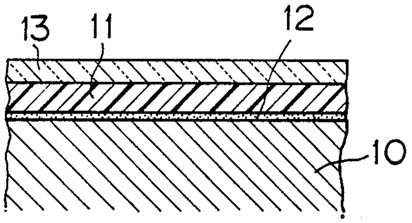
FIG. 2 is an enlarged sectional view of a marking portion of the work and films adhered thereto.

Now referring to FIG. 2, in the illustrated embodiment, the marking surface is located on a cowl panel 10 to which a colour film 11 is adhered by means of an adhesive 12 and a transparent or translucent film 13 is adhered to the colour film 11 to form a label for recording the vehicle information when the films 11 and 13 are integrally peeled off from the surface of the cowl panel 10.

Figure 3:
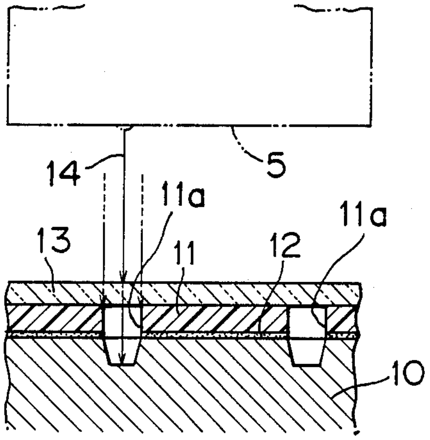
FIG. 3 is an enlarged sectional view of the work and films adhered thereto to which a laser beam is applied.

The transparent film 13 is made of a polyester resin or vinyl chloride base resin with approximately 50 micrometers in thickness because of high transmissivity thereof. The colour film 11 made of aluminum is formed on the transparent film 13 with approximately 5 through 10 micrometers in thickness by means of a vacuum deposition. The adhesive 12 is made of an acrylic resin and applied between the marking surface of the work 1 and the colour film 11 with approximately 30 micrometers in thickness. In this embodiment, as shown in FIG. 3 the laser beam 14 is produced to be applied on the film 11, 13 and the marking surface of the work 1 through a laser head 5 of a laser device including a laser rod of neodymium yttrium aluminum garnet. The laser device is a 50 watt rating type device and produces a giant pulse. The laser beam produced by the laser device has a wave length of 1060 nm with 3 through 6 kHz in frequency. The marking speed or the moving speed of the laser head 5 is maintained at approximately 8 through 10 mm/sec.

The laser beam transilluminates the transparent film 13 while the laser beam is absorbed by the colour film 11 and the work 1 because of the wave length. Therefore, when the laser beam 14 is applied on the films 11, 13 and work 1, there occurs no change in the transparent film 13, but the colour film 11 and work 1 absorb the laser beam 14 to be melted away so that the hole 11*a* in the color film 11 and recess 10*a* in the work are formed so as to express the predetermined information as shown in FIG. 3.

Figure 4:
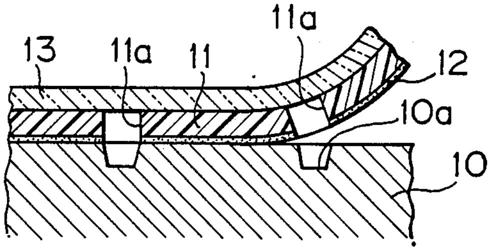
FIG. 4 is an enlarged sectional view of the work and films adhered thereto in which the films are being peeled off from the work surface.

Thereafter the films 11 and 13 are integrally removed from the marking surface of the work 1 as shown in FIG. 4. The removed films 11 and 13 can be used effectively as a recording label for recording the information concerning the vehicle because the information denoted by the hole 11*a* of the film 11 is sophisticatedly identical with the information denoted by the recess 10a of the work 1. Further, since the transparent film 11 is not affected by the laser beam 14, a proper label can be produced without any drop-out of the separate portion surrounded by a molten portion in the colour film 11 when a specific character such as "0","8","9" and the like is employed for denoting the information. Further the film 13 overlapped with the film 11 is transparent so that the information shown by the molten portion of the colour film 11 can be readily and correctly figured out.

It will further be understood that according to the marking method as aforementioned, the mark on the work surface and the label are simultaneously produced by only one marking treatment to reduce the marking treatment time and facitate the marking treatment.

I claim:

1. A laser marking method comprising the steps of:

providing at least one label material element consisting of a first layer of aluminum absorbing a visible ray and a second layer transilluminating the visible ray, applying the label material on a marking surface of a work;

illuminating the marking surface through the label material with a laser beam of a wave length transilluminating said second layer so as to form a mark of certain information on the marking surface of the work and in said first layer of the label material, and removing the label material from the marking surface of the work to produce a recorded label.

2. A laser marking method in accordance with claim 1 and further comprising the step of joining the first layer and the second layer to form said label material element.

3. A laser marking method in accordance with claim 2 in which the second layer is made from one of an polyester resin and a vinyl chloride base resin.

4. A laser marking method in accordance with claim 1 in which an adhesive is employed for adhering the label material element to the marking surface of the work, the adhesive being adhered to the label material element.

5. A laser marking method in accordance with claim 4 in which the adhesive is made of an acrylic base resin.

6. A laser marking method in accordance with claim 1 in which the laser is YAG laser.

7. A laser marking method in accordance with claim 1 in which information to be marked is provided prior to a marking treatment and the information is read and marked on the work at a marking station.

* * * * *